United States Patent [19]

Stephan

[11] 4,403,812
[45] Sep. 13, 1983

[54] RADIAL BEARING ASSEMBLY

[75] Inventor: Gérard Stephan, Croissy, France

[73] Assignee: Nadella, France

[21] Appl. No.: 383,621

[22] Filed: Jun. 1, 1982

Related U.S. Application Data

[63] Continuation of Ser. No. 272,289, Jun. 10, 1981, abandoned, which is a continuation of Ser. No. 38,847, May 14, 1979, abandoned.

[30] Foreign Application Priority Data

May 23, 1978 [FR] France .................. 78 15228

[51] Int. Cl.³ .............................................. F16C 27/06
[52] U.S. Cl. ................................................ 308/184 R
[58] Field of Search ............... 308/184 R, 184 A, 194, 308/236, DIG. 4; 384/222, 220, 215

[56] References Cited

U.S. PATENT DOCUMENTS

| | | | |
|---|---|---|---|
| 3,630,586 | 12/1971 | Pitner | 308/184 R |
| 3,704,922 | 12/1972 | Kleinschmidt et al. | |
| 3,883,194 | 5/1975 | Pitner | 308/184 R |
| 3,890,854 | 6/1975 | Pitner | 308/184 R |
| 3,976,340 | 8/1976 | Pitner | 308/184 R |

FOREIGN PATENT DOCUMENTS 1204156 9/1970 United Kingdom ............ 308/184 R Primary Examiner—Lenard A. Footland
Attorney, Agent, or Firm—Robert E. Burns; Emmanuel J. Lobato; Bruce L. Adams

[57] ABSTRACT

A radial bearing assembly with play take-up comprises an elastically deformable ring inserted into and compressively held by an elastic sleeve. The internal surface of the ring comprises the outer race for bearing elements and the ring is suitably shaped to create a reduced or zero circulation clearance for the bearing elements at angularly spaced zones during use of the bearing assembly. The elastic sleeve is inserted into a rigid sheath whose radial thickness is greater than the combined radial thickness of the sleeve and ring so that the sheath principally determines the radial size of the bearing assembly.

12 Claims, 4 Drawing Figures

RADIAL BEARING ASSEMBLY

This is continuation of application Ser. No. 272,289, filed June 10, 1981, abandoned which in turn is a Rule 60 continuation application of parent application Ser. No. 038,847 filed May 14, 1979 abandoned.

BACKGROUND OF THE INVENTION

The present invention relates to a radial bearing assembly and more particularly concerns such a bearing with play take-up.

Bearing assemblies of this type are already known which comprise an elastic sleeve within which there is engaged a thin, elastically deformable, metallic ring the internal surface of which serves as race for cylindrical bearing elements to which, on assembly, it offers a reduced circulation clearance at angularly spaced zones.

Such bearing assemblies, which give full satisfaction for ordinary radial dimensions, however pose serious problems, both technical and economical, when for certain applications such as in the field of heavy lorries for example, it is necessary to make them with relatively large radial dimensions.

In fact the sleeve of elastomeric material, which is generally intended to be inserted into a tubular element through which the shaft passes on which the bearing assembly is fitted, would in such applications possess a radial dimension such that it would dangerously increase its tendency to creep, which would possibly prevent it from carrying out its function of compressing the ring. Also, this large radial dimension of elastomer would compromise the essential rigidity for mounting the shaft in the tubular element.

Moreover, such an assembly uses a relatively large volume of elastomeric material.

SUMMARY OF THE INVENTION

An object of the present invention is to provide a radial bearing assembly which overcomes the above-mentioned drawbacks, while providing play take-up for radial bearing assemblies of large dimensions, in a manner which is both economical and ensures rigidity for the shaft mounting.

According to the present invention, a radial bearing assembly with play take-up comprises an elastic sleeve within which is engaged an elastically deformable thin ring whose internal surface defines an outer race for cylindrical bearing elements to which the ring offers, on assembly, a reduced or zero circulation clearance at angularly spaced zones, characterized in that the elastic sleeve is in a sheath having a radial thickness such that, in combination with the sleeve, a desired radial size for the assembly can be obtained.

In a preferred embodiment of the invention, the sheath is made of a substantially rigid plastics material.

A bearing assembly in accordance with the invention uses a low cost raw material that can be selected to give desired rigidity while limiting the amount of more expensive sleeve material to that strictly necessary to ensure its function of ring compression.

BRIEF DESCRIPTION OF THE DRAWINGS

The above and other features of the invention are illustrated, by way of example, in the accompanying drawings, wherein.

DETAILED DESCRIPTION OF PREFERRED EMBODIMENTS

Figure 1:
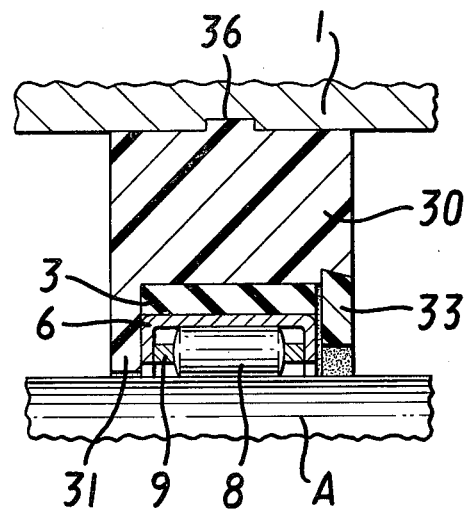
FIGS. 1 and 2 are part-axial and radial sections of a first embodiment of a bearing assembly in accordance with the invention.
Figure 2:
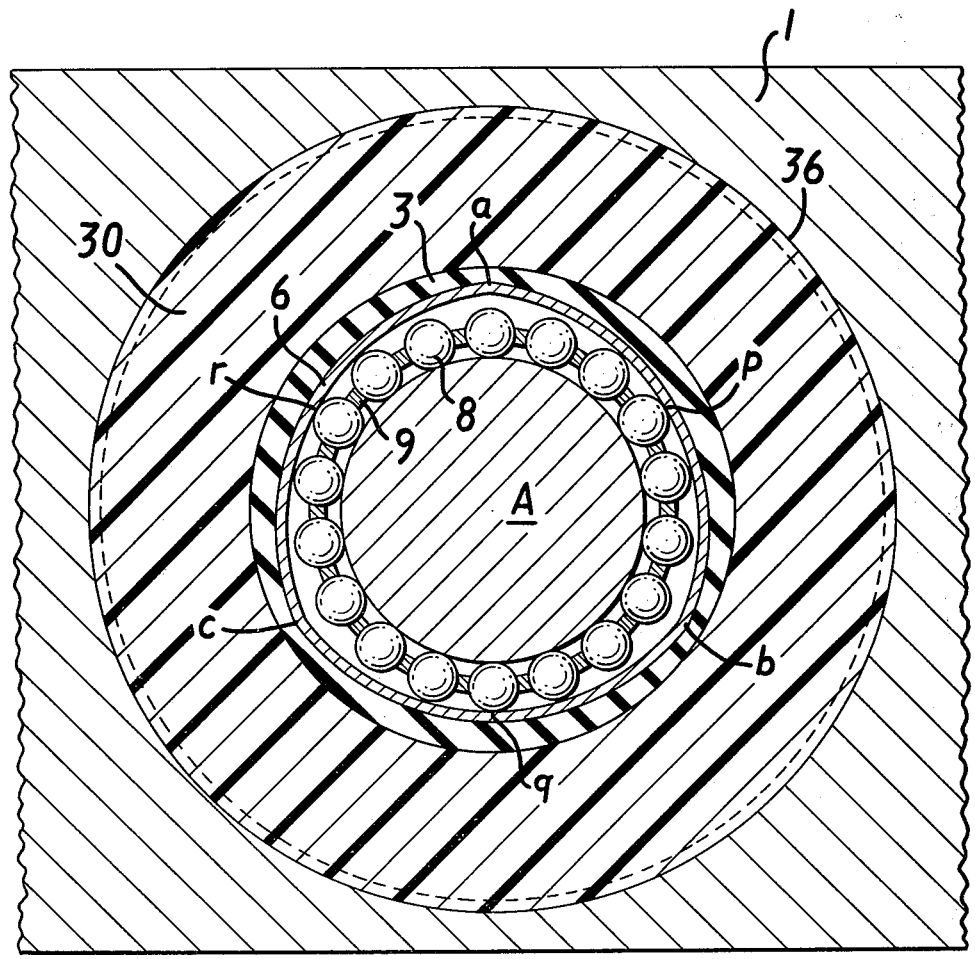

FIG. 1 shows in part-axial section a bearing assembly with play take-up comprising an elastic sleeve 3 made of rubber, or another elastomeric material or any other material having analogous elastic properties, within which there is inserted an elastically deformable metallic ring 6. The internal surface of the metallic ring 6 serves as an outer race for rolling elements such as needles or rollers 8 which can be held by a cage 9. The ring 6, on assembly, offers a reduced or zero circulation clearance, p, q, r, at angularly spaced zones to the needles or rollers. The part assembly is inserted into a sheath 30 having little or no elasticity and made of ordinary plastics material, which can thus possess a certain rigidity enabling a desired radial dimension for the whole assembly to be obtained while ensuring necessary mounting rigidity for the assembly on insertion thereof into a tubular element or bore 1 intended for the passage of a shaft A. As shown in FIGS. 1 and 2, the radial extent or thickness of the sheath 30 is greater than the combined radial thickness of the sleeve 3 and ring 6 so that the radial size of the bearing assembly is principally determined by the sheath.

Figure 3:
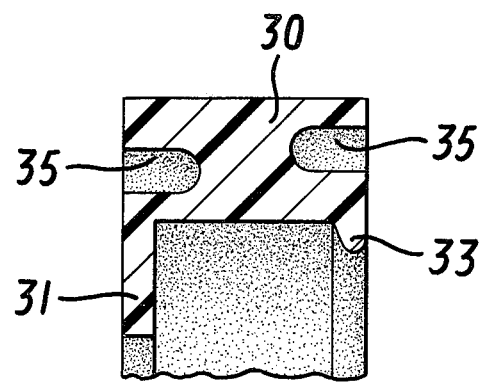
FIG. 3 is a part-axial section of an alternative form of sheath to that shown in FIG. 1.

To ensure the axial location of the bearing in the sheath the latter has at least one radial projection forming a stop which can either be an integral part 31 of the sheath or be a separate part, attached at 33. FIG. 3 shows radial projections 31, 33 of unequal lengths, formed during moulding of the sheath, these projections enabling the sleeve 6 to be introduced into the sheath by deformation of the short projection 33.

To facilitate the forced insertion of the sheath into a tubular element or a bore, axial recesses 35, which may or may not open to the radial end faces of the sheath, are provided in the sheath to impart the required compressibility thereto.

The outer axial surface of the sheath can be provided with at least one annular peripheral rib 36, or the like appendage, capable of engaging in a complementary shaped aperture or groove formed in the tubular element or bore which receives the sheath, in order to axially immobilize the sheath and retain it in place within the tubular element or bore.

The play take-up radial bearing inserted into the sheath can be of the type described in FIG. 3 of United Kingdom Pat. No. 1 204 156, according to which the elastic sleeve has three zones of excess thickness which in crushing on contact with the bore are deformed inwards at a, b and c and at the same time deform the ring in three zones p, q, r; or one of the alternative bearings described in U.S. Pat. No. 3,883,194 according to which the ring is inserted into a substantially cylindrical sleeve and is pre-formed with an irregular profile, the profile being preferably obtained by triangulation of the ring to define three segments a, b, c, with large clearance, alternating with segments p, q, r, which offer a reduced and preferably zero circulation clearance to the needles, as represented in FIG. 2 of the present application.

Figure 4:
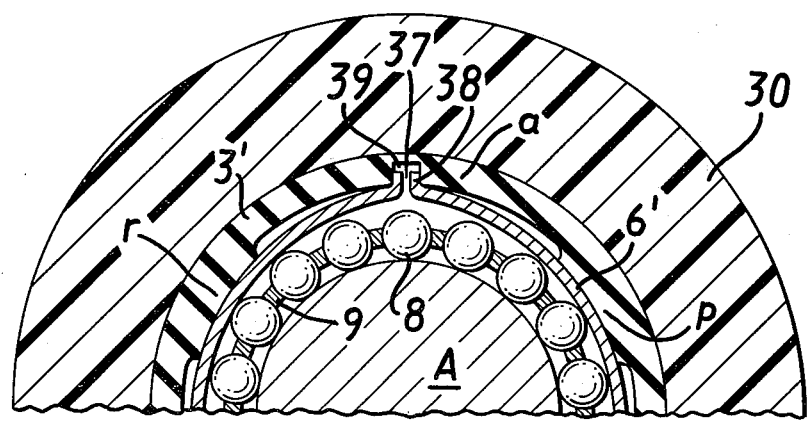
FIG. 4 is a part-radial section of another embodiment of a bearing assembly in accordance with the invention.

According to an embodiment that is shown partially in FIG. 4, the play take-up bearing intended to be inserted into the sheath 30' can be formed by a cylindrical or non-cylindrical split ring 6', obtained by stamping or rolling from a strip, and split at 37 along a generatrix or preferably along a profile forming an angle with the axis of the bearing. However, in order to prevent the two ends of the split ring from pinching the elastic sleeve 3' in its elastic deformation while in operation, the two ends of the split ring 6' forming the slot 37 may have outwardly turned lips 38 which may be disposed in a substantially axial groove or opening 39 provided in the body of the sleeve 3.

According to this embodiment, the sleeve 3, which can be cylindrical, preferably possesses an irregular profile formed, for example, by three segments p', q', r', of excess thickness spaced at 120° intervals and upon which the ring comes to press and which define zones of reduced or zero clearance for the needles 8, alternating with zones of large clearance situated in line with the segments a', b', c' of the sleeve which are disengaged from the ring 6' and of which one (the segment a' situated between the segments p' and r') is provided with the above-mentioned groove 39.

As explained above, the volume of the elastomeric material forming the sleeve 3 is reduced to the minimum necessary to ensure compression of the ring with the consequence that, in practice, the volume of the annulus forming the sheath 30 is at least as great, if not much greater, than that of the sleeve which thus assumes a supplementary role of filling-in bearings of relatively large radial dimensions.

It may be imagined that, for an extreme example of the invention, the annular sleeve may be replaced by three elastic cushions staggered at 120°, either separated or interconnected, and rendered fast with the internal bore of the sheath.

The sheath 30 equipped with the various means 31, 33, 35, 36 is preferably moulded in one single operation.

The sheath can of course be made of any other material having the same characteristics as that of the exemplary plastics material.

I claim:

1. A radial rolling bearing assembly with play take-up of the type comprising a sleeve of an elastomer within which is engaged an elastically deformable thin metal ring whose internal surface defines an outer race for cylindrical rolling elements to which the ring offers, on assembly, a reduced circulation clearance at angularly spaced zones; the improvement comprising a sheath encircling said sleeve and made of a plastics material which is harder and less elastic than the elastomer of said sleeve and has a radial thickness which is greater than the combined radial thickness of said sleeve and ring so that said sheath principally determines the overall radial size of the bearing assembly.

2. An assembly as claimed in claim 1; wherein said sheath has at least one part forming an axial stop for said sleeve.

3. An assembly as claimed in claim 2; wherein said sheath has at least one recess effective to impart a measure of radial compressibility to said sheath so as to facilitate insertion of the bearing assembly into a bore.

4. An assembly as claimed in claim 3; wherein said ring has a pre-formed irregular profile to take-up play.

5. An assembly as claimed in claim 4; wherein said ring has a pre-formed triangular profile.

6. An assembly as claimed in claim 1; wherein said ring comprises a split ring having two spaced-apart ends which define therebetween the split.

7. An assembly as claimed in claim 3; wherein said sleeve has an internal bore of irregular cross-section to take-up play.

8. A radial bearing assembly with play take-up of the type comprising an elastic sleeve within which is engaged an elastically deformable thin ring whose internal surface defines an outer race for cylindrical bearing elements to which the ring offers, on assembly, a reduced circulation clearance at angularly spaced zones; the improvement comprising a sheath encircling said sleeve and having a radial thickness greater than the combined radial thickness of said elastic sleeve and ring so that said sheath principally determines the overall radial size of the bearing assembly, said ring being split and having end portions which define the split and have radially and axially extending lips which are disposed in an axially extending groove in the sleeve.

9. In a radial bearing assembly with play take-up of the type comprising a sleeve of elastomer encircling an elastically deformable metal ring whose internal surface defines an outer race for rolling elements and whose shape effectively creates a reduced circulation clearance for the rolling elements at angularly spaced zones during use of the bearing assembly; a sheath encircling said sleeve and having a predetermined radial thickness at least greater than that of said sleeve and ring combined to thereby principally determine the overall radial size of the bearing assembly and being composed of material like a plastics material which is more rigid than that of said sleeve so that the rigidity of the bearing assembly is principally determined by said sheath.

10. A radial bearing assembly according to claim 9; further including means on said sheath for axially retaining said sleeve in said sheath.

11. A radial bearing assembly according to claim 9; wherein said sleeve has a radial dimension sufficiently small to thereby effectively prevent creep of the sleeve during use of the bearing assembly.

12. A radial bearing assembly according to claim 9; wherein the radial thickness of said sheath is at least several times greater than the radial thickness of said sleeve.

* * * * *